United States Patent Office 3,232,864
Patented Feb. 1, 1966

3,232,864
PREPARATION OF A HYDROCARBON HYDROCRACKING CATALYST FOR USE IN THE CONVERSION OF HYDROCARBONS
Ernest L. Pollitzer, Hinsdale, Ill., assignor to Universal Oil Products Company, Des Plaines, Ill., a corporation of Delaware
No Drawing. Filed Mar. 23, 1964, Ser. No. 354,150
4 Claims. (Cl. 208—110)

The present application is a continuation-in-part of my copending application, Serial Number 150,130, filed November 6, 1961, now abandoned, all of the teachings of which are incorporated herein by reference thereto.

The present invention relates to a method for preparing a catalytic composite of high activity and increased stability, and, in one embodiment, is directed toward the utilization of a specially prepared catalytic composite for the conversion of heavy hydrocarbonaceous material into lower-boiling hydrocarbon products. More specifically, the present invention encompasses a novel method for the preparation of a hydrocracking catalyst comprising at least one metallic component selected from Group VIII of the Periodic Table, and particularly the iron-group thereof.

Hydrocracking, also sometimes referred to as "destructive hydrogenation," is designated as cracking under hydrogenation conditions, and in the presence of hydrogen, such that the lower-boiling products of the involved reactions are substantially more saturated than when hydrogen, or material supplying the same, is not present. Hydrocracking processes are most commonly employed for the conversion of various heavy hydrocarbonaceous material including coal, tars and heavy residual oils, black oils, kerosene fractions, gas oil fractions, lubricating oil and white oil stocks, cycle stocks, various fuel oils and other sources of hydrocarbons having a depreciated market demand due to the high boiling points of these hydrocarbons. The object of such hydrocracking processes is to convert the heavy hydrocarbonaceous charge stock into substantial yields of lower-boiling saturated hydrocarbons having a greater degree and latitude of usefulness.

Although many hydrocracking, or destructive hydrogenation processes may be, and are, conducted on a strictly thermal basis, the more preferred processing technique involves the utilization of a catalytic composite possessing hydrocracking and hydrogenation activity. Successful hydrocracking processes must necessarily be extremely selective, and the selectivity must be carefully controlled in order to avoid the decomposition of valuable normally liquid hydrocarbons substantially or completely into normally gaseous hydrocarbons constituting waste material of the process. As a result of excessive production of gaseous hydrocarbons, inherent in non-selective hydrocracking, the yield of normally liquid hydrocarbons can be decreased to the extent that the process is not economically feasible. Non-selective, or uncontrolled hydrocracking must necessarily be avoided since this inherently results in a more rapid formation of coke and other heavy hydrocarbonaceous material on the catalyst surface, thereby decreasing or destroying the capability thereof to catalyze the desired reactions in the most advantageous manner. Such deactivation results in a shorter processing cycle or period, with the necessity of more frequent regeneration of the catalyst, or total replacement thereof. Deactivation of the catalyst composite appears to inhibit the hydrogenation activity to the extent that a significant proportion of the lower-boiling hydrocarbon product consists of olefinic and diolefinic hydrocarbons, whereby the same is not highly suited for immediate further processing by catalytic reforming.

The chemical reactions effected during the conversion of hydrocarbonaceous material in the presence of hydrogen, tend to be slightly exothermic, and self-sustaining after the reactions have been initiated. Without more, cracking reactions are endothermic and hydrogenation quite exothermic. The tendency to experience a temperature run-away at the outset of the process, whereby excessive quantities of carbon are initially deposited upon the catalytic composite, apparently results from a hydrogenation run-away triggered before the accompanying cracking reactions can exert a dampening effect. The end result is a loss of catalyst stability, or the capability of functioning acceptably for an extended period of time.

Various prior art hydrocracking processes have recognized the existence and deleterious effects of a temperature run-away at the outset of the process. These prior art processes generally utilize a catalytic composite consisting of a siliceous carrier material and at least one metallic component selected from the group of the metals of Group VIII of the Periodic Table. In order to avoid the deleterious effects of the frequently experienced temperature run-away, such catalytic composites are utilized with the catalytically active metallic components existing in a highly sulfided state. The utilization of sulfided catalysts is stated as permitting operation at relatively low catalyst bed inlet temperatures, while simultaneously avoiding an initially high rise in the average operating temperature, in turn resulting in the deposition of excessive quantities of carbon.

An object of the present invention is to provide a catalytic composite, particularly for utilization in hydrocracking processes, the use of which avoids the temperature run-away without the necessity of causing the catalytically active metallic components to exist in a highly sulfided state. This object is achieved through the utilization of a particular processing technique wherein the catalytic composite, following the calcination thereof in an oxygen-containing atmosphere, such as air, and without cooling to a temperature below 1000° F., is subjected to pre-reduction at an elevated temperature of at least about 1000° F., having an upper limit of about 1200° F. I have found that this procedure avoids the necessity of an involved, tedious sulfiding technique to prevent the deleterious temperature run-away, and furthermore, increases the activity and stability of the catalyst by increasing the crystallite size of the catalytically active metallic components to a level in excess of about 60° Angstrom units.

In a broad embodiment, the present invention relates to a method of preparing a catalyst which comprises compositing at least one metallic component from Group VIII of the Periodic Table with a refractory inorganic oxide carrier material, calcining the resultant composite in an oxygen-containing atmosphere at a temperature of from about 1100° F. to about 1700° F., and, without cooling to a temperature below 1000° F., thereafter subjecting the calcined composite to the reducing action of hydrogen at a temperature within the range of from about 1000° F. to about 1200° F. for at least two hours.

Another broad embodiment of the present invention involves a method of preparing a catalyst which comprises compositing at least one metallic component from Group VIII of the Periodic Table with a refractory inorganic oxide carrier material, calcining the resultant composite in an oxygen-containing atmosphere at a temperature of from about 1100° F. to about 1700° F., and, without cooling to a temperature below 1000° F., thereafter reducing the calcined composite in an atmosphere of hydrogen, at a temperature within the range of about 1000° F. to about 1200° F. and for a time sufficient to increase the crystallite size of said metallic component to a level of from about 60° to about 100° Angstrom units.

A more limited embodiment of the present invention encompasses a process for converting hydrocarbonaceous material into lower-boiling hydrocarbon products which comprises reacting said hydrocarbonaceous material with hydrogen under hydrocracking conditions in the presence of a hydrocracking catalyst containing at least one metallic component from Group VIII of the Periodic Table composited with a refractory inorganic oxide carrier material; said catalyst having been calcined in air at a temperature of from about 1100° F. to about 1700° F. and, without cooling to a temperature below 1000° F., thereafter pre-reduced in an atmosphere of hydrogen at a temperature within the range of about 1000° F. to about 1200° F. for at least two hours.

A more specific embodiment of the present invention is directed toward a process of converting hydrocarbonaceous material boiling within the range of about 120° F. to about 1100° F., into lower-boiling hydrocarbon products which comprises reacting said hydrocarbonaceous material with hydrogen under a pressure in excess of about 1000 pounds per square inch gauge, having an upper limit of about 3000 pounds per square inch gauge, and at a temperature within the range of from about 350° F. to about 750° F., in the presence of a catalytic composite of a siliceous carrier material and at least one metallic component from Group VIII of the Periodic Table on a refractory inorganic oxide carrier material; said composite having been calcined in air at a temperature of from about 1100° F. to about 1700° F. and, without cooling to a temperature below 1000° F., thereafter pre-reduced in an atmosphere of hydrogen, at a temperature within the range of from about 1000° F. to about 1200° F. and for a time sufficient to increase the crystallite size of said metallic component to above about 60° Angstrom units.

In the present specification and the appended claims, the term "hydrocarbonaceous material" is intended to connote saturated hydrocarbons, straight-chain and branch-chain hydrocarbons, unsaturated hydrocarbons, aromatic hydrocarbons, naphthenic hydrocarbons, as well as mixtures of various hydrocarbons such as hydrocarbon fractions and/or hydrocarbon distillates. The phrase, "gasoline boiling range hydrocarbons" is intended to designate those hydrocarbons boiling within the range of a temperature of from about 100° F. to about 400° F. or 450° F. The term "middle-distillate," refers to those hydrocarbon fractions having an initial boiling point above about 400° F. to about 450° F., and an end boiling point within the range of from about 650° F. to about 700° F. In regard to the various catalytic composites employed within the hydrocracking reaction zone, and prepared by the method of the present invention, the term "metallic component" or "catalytically active metallic component," is intended to encompass those components of the catalyst which are employed for their hydrocracking and hydrogenation activity, thereby distinguishing from those components which are primarily utilized as the carrier material. The diverse metallic components integrated within the various catalytic composites which may be improved in activity and stability through the utilization of the method of the present invention, are those which are selected from the metals of Group VIII of the Periodic Table. The metallic component of the catalyst of the present invention may comprise mixtures of two or more of such metals, as well as the compounds thereof, including iron, cobalt, nickel, palladium, platinum, ruthenium, rhodium, osmium, iridium, nickel-cobalt, nickel-platinum, nickel-palladium, etc.

The foregoing metallic components are generally combined with at least one refractory inorganic oxide, and, when the composite is to be utilized in hydrocracking-hydrogenation processes, the metallic components are, generally, combined with a siliceous carrier material. Suitable refractory inorganic oxide material, for utilization as the carrier for the catalytically active metallic components, include alumina, silica, zirconia, magnesia, titania, thoria, boron oxide, hafnia, strontia, etc. The precise composition of the carrier material is generally dependent upon the physical and/or chemical characteristics of the charge stock to the process, and upon the end result which is to be achieved.

As hereinbefore set forth, an essential feature of the present invention is the high-temperature, pre-reduction of the catalytic composite during the preparation thereof. Generally, this technique is the last step taken during the manufacture of the catalyst, after all the catalytically active components have been combined. It is recognized that the prior art, relating to the manufacture of various types of catalytic composites, teaches a reduction technique generally following the drying and/or calcination of the composite. The prior art manufacturing techniques are not, however, primarily concerned with the temperature at which the hydrogen reduction is effected, since there is no recognition of a change in the crystallite size of the metallic component at a reduction temperature greater than 1000° F., having an upper limit of about 1200° F. Generally, the reduction techniques of the prior art are carried out at temperatures in the range of from about 600° F. to about 900° F., and either after being cooled from the temperature of calcinations, or in situ within the reaction zone prior to the initial charge of the hydrocarbon stream to be processed.

To the contrary, the method of the present invention requires a reduction technique, in hydrogen, at a temperature within the range of 1000° F. to about 1200° F., without cooling to a temperature below 1000° F., and immediately following the high-temperature calcination in air. As hereinbefore set forth, I have found that the high-temperature pre-reduction eliminates the necessity for sulfiding the catalytic composite prior to use. Furthermore, the crystallite size of the catalytically active metallic components is substantially increased, in turn increasing the initial activity, and particularly the stability of the composite. Through the elimination of the sulfiding technique a greater amount of catalytically active centers and surfaces are exposed to the material being processed; when the catalytically active metallic components are subjected to a sulfiding technique, at least a portion of the combined sulfur must necessarily occupy these active centers and surfaces, thereby effectively shielding the same from the material being processed.

Prior to effecting the high-temperature, pre-reduction technique, the catalytic composite may be prepared in any suitable manner. The synthetically-produced solid carrier material may be made through the use of separate, successive or co-precipitation methods. For example, alumina may be prepared by adding a reagent such as ammonium hydroxide, ammonium carbonate, etc., to a salt of aluminum such as aluminum chloride, aluminum nitrate, aluminum acetate, etc., and in an amount to form the requisite quantity of aluminum hydroxide. The resulting precipitate is, upon drying and high-temperature calcination in an oxygen-containing atmosphere, converted to alumina. The carrier material particles may take the form of any desired shape such as spheres, pills, pelets, cakes, extrudates, powder, granules, etc. A particularly preferred form of carrier is the sphere, and these spheres may be continuously manufactured by passing droplets of an alumina hydrosol into an oil bath maintained at elevated temperature, retaining the droplets in said oil bath until the same set into firm hydrogel spheroids. Similarly, silica may be prepared in any suitable manner, one method being to commingle water glass and a mineral acid under conditions which precipitate a silica hydrogel. The silica hydrogel is subsequently washed with water, containing a small amount of a suitable electrolyte, for the purpose of removing sodium ions. Oxides of other compounds, such as zirconia, titania, etc., may be prepared by reacting a basic reagent such as ammonium hydroxide, ammonium carbonate, etc., with an acid-salt solution of the metal such as, the chloride, sulfate, nitrate, etc., or by adding an acid to an alkaline salt of the metal such as, for example, commingling sulfuric acid with sodium titanate, etc. In those instances where the carrier material comprises two or more refractory inorganic oxides, it may be prepared by a separate precipitation method wherein the oxides are precipitated separately and then mixed, preferably in the wet state; when successive precipitation methods are employed, the first oxide is precipitated and the wet slurry, either with or without prior washing, is composited with a salt of the other component, the precipitation of the oxide thereof being effected by the addition of a suitable alkaline or acidic material to the resulting slurry. The composite which results may then be dried and formed into the desired shape and/or size. When the carrier material comprises silica and alumina, and/or zirconia, it is preferentially manufactured by commingling an acid such as hydrochloric acid, sulfuric acid, etc., with commercial water glass under conditions which precipitate silica, washing the precipitate with acidified water or other means to remove sodium ions, commingling with an aluminum and/or zirconium salt such as aluminum chloride, and either adding a basic material such as ammonium hydroxide to precipitate alumina and/or zirconia, or forming the desired oxide or oxides through the thermal decomposition of the salt. The silica-alumina-zirconia cracking component may be formed by adding the aluminum and/or zirconium salts together or separately. Other siliceous cracking components may be prepared in a similar manner, however, not necessarily with equivalent results. The precise means employed for the manufacture of the carrier material is not considered to be a limiting feature of the present invention.

The catalytically active metallic components are then composited with the aforementioned carrier in any suitable manner. These metallic components are generally employed in an amount of from about 0.1% to about 20.0% by weight, based upon the weight of the total catalyst. The catalytic composite comprises at least one metallic component selected from the metals of Group VIII of the Periodic Table, and included platinum, palladium, nickel, etc. Impregnating techniques are preferred, and may be advantageously employed by first forming an aqueous solution of a water-soluble compound of the desired metallic component such as platinum chloride, palladium chloride, nickel nitrate hexahydrate, dinitritodiamino platinum, cobaltous chloride, chloroplatinic acid, chloropalladic acid, etc., and commingling the solution with the carrier material in a steam drier. Oother suitable metal-containing solutions which may be employed are colloidal solutions or suspensions including the desired metal cyanides, metal hydroxides, metal oxides, metal sulfides, etc. Where these solutions are not water-soluble at the temperature employed, other suitable solvents such as alcohols, ethers, etc., may be employed. The final catalytic composite, after all of the components are combined therein, is dried for a period of from about 2 to about 8 hours or more, and subsequently calcined in an oxygen-containing atmosphere, such as air, at an elevated temperature of from about 1100° F. to about 1700° F., and for a period of from about 1 to about 8 hours or more. Following this high-temperature calcination procedure, and without cooling to a temperature below 1000° F., the composite is subjected to a high-temperature reduction, in the presence of hydrogen, at a temperature within the range of from about 1000° F. to about 1200° F. The catalytic composite is exposed to hydrogen at a temperature within the aforementioned range for a time sufficient to cause the crystallite size of the metallic component to increase above a level of about 60° Angstrom units. Thus, the high-temperature reduction technique will be effected over a period of time from about 2 to about 12 hours or more.

It is preferred that the catalytic composite, prepared in accordance with the high-temperature, pre-reduction method of the present invention, comprise at least two refractory inorganic oxides, and preferably a suitable combination of alumina and silica. When silica and alumina are employed the latter will be present within an amount of from about 10% to about 90% by weight. Excellent results have been achieved through the utilization of the following silica-alumina composites: 88% by weight of silica and 12% by weight of alumina, 75% by weight of silica and 25% by weight of alumina, 88% by weight of alumina and 12% by weight of silica. The Group VIII metals, which may be divided into two sub-groups, are present in an amount of from about 0.1% to about 20.0% by weight of the total catalyst. When an iron sub-group metal, such as iron, cobalt, or nickel, is employed, it is present in an amount of from about 0.1% to about 15.0% by weight, while, if a platinum-group metal such as platinum, palladium, iridium, etc., is employed, it is generally present in an amount within the range of from about 0.1% to about 5.0% by weight of the total catalyst. Suitable catalysts, include the following, but not by way of limitation: 6.0% by weight of nickel and 0.2% by weight of cobalt; 6.0% by weight of nickel; 0.4% by weight of palladium; 6.0% by weight of nickel and 0.2% by weight of palladium; 6.0% by weight of nickel and 0.2% by weight of platinum, etc.

The catalytic composite, prepared in accordance with the method of the present invention, is preferably disposed within the reaction zone as a fixed bed. The hydrocarbon charge stock, after being combined with hydrogen in an amount of from about 2000 to about 20,000 standard cubic feet per barrel, and preferably at least about 5000 standard cubic feet; is introduced into the reaction zone. The charge stock may be in a liquid, vapor, or liquid-vapor phase mixture, depending upon the temperature, pressure, proportion of hydrogen and the boiling range of the charge stock being processed. The liquid hourly space velocity thorugh the reaction zone will be in excess of about 0.2, and generally within the range of about 1.0 to about 15.0. The source of the hydrogen being admixed with the hydrocarbon charge stock may comprise a high-pressure, low-temperature separation zone from which a hydrogen-rich gas stream is withdrawn and recycled to supply at least a portion of such hydrogen. Excess hydrogen resulting from the various dehydrogenation reaction effected in a catalytic reforming unit may be employed in admixture with the hydrocarbon charge. The reaction zone will operate under an imposed pressure within the range of about 1000 to about 3000 pounds per square inch gauge. The catalyst bed inlet temperature is maintained within the range of about 350° F. to about 750° F. Since the hydrocracking reactions are exothermic, the outlet temperature or the temperature at the bottom of the catalyst bed will be significantly higher than that at the inlet thereto. The degree of exothermicity exhibited by the temperature rise across the catalyst bed is at least partially dependent upon the character of the charging stock passing therethrough, the rate at which the normally liquid hydrocarbons contact the catalyst bed, the intended degree of conversion to lower-boiling hydrocarbon products, etc. In any event, the catalyst bed inlet temperature will be such that the exothermicity of the reactions taking place does not cause the temperature at the outlet of the catalyst bed to exceed about 900° F., and preferably 850° F. The operation may also be effected as a moving-bed type, or a suspensoid type of operation in which the catalyst, hydrocarbons and hydrogen are admixed and passed as a slurry through the reaction zone.

Although the method of preparing the catalyst, and the careful selection of operating conditions within the ranges hereinbefore set forth, extend the effective life of the catalytic composite, regeneration thereof may eventually become desired due to the natural deterioration of the catalytically active metallic components. The catalytic composite is readily regenerated by contacting the same with a free oxygen-containing gaseous material, at temperatures within the range of about 700° F. to about 1400° F., for the purpose of removing coke and other heavy hydrocarbonaceous material therefrom. The resulting metal oxide, such as nickel, platinum and/or cobalt oxide, etc., may then be subjected to the reducing action of hydrogen, in situ, at a temperature within the range of from about 1000° F. to about 1200° F.

The following example is given to illustrate the method of preparing the catalyst in accordance with the present invention, and to indicate the benefits to be afforded through the utilization thereof in converting heavy hydrocarbonaceous material into substantial yields of lower-boiling hydrocarbon products. It is understood that the example is given for the sole purpose of illustration, and is not considered to limit the generally broad scope and spirit of the appended claims.

*Example*

The catalyst employed in this example comprised 5.0% by weight of nickel, calculated as the element and based upon the total weight of the final composite, and a carrier material consisting of 75.0% by weight of silica and 25.0% by weight of alumina. The silica-alumina composite was prepared by diluting 1610 grams of water glass (28% by weight of $SiO_2$) with 3220 cc. of water, adding thereto 400 cc. of hydrochloric acid, plus an additional 800 cc. of water. The resulting acid-silica hydrosol was then added to 1580 cc. of an aluminum sulfate solution, having a specific gravity of 1.28 and prepared from iron-free hydrated aluminum sulfate crystals. The resulting alumina-silica hydrosol was then commingled, with vigorous stirring, with 1280 cc. of an aqueous solution of ammonium hydroxide containing 640 cc. of a 28% by weight solution of ammonia. The resulting hydrogel was filtered, reslurried in 8 liters of water, and dried. The dried material was subjected to several washing procedures, with filtering, until the filtrate indicated a negative test for sulfate ions. The sulfate-free composite was further dried at a temperature of about 300° F., ground into a fine talc-like powder and formed into 1/8 inch by 1/8 inch cylindrical pills. The pills were subjected to high-temperature calcination, in an atmosphere of air, for a period of 3 hours at a temperature of 1200° F. An impregnating solution was then prepared by dissolving of the requisite quantity of nickel nitrate hexahydrate in water, and further diluting the resulting solution to about 250 milliliters with water. A 200-gram portion of the previously described alumina-silica cylindrical pills was impregnated with the resulting solution in a rotating steam dryer. The dried catalyst was then calcined at an elevated temperature of 1200° F. The calcined catalyst was divided into separate portions, the first being subjected to a reducing technique, in an atmosphere of hydrogen, for a period of 2 hours at a temperature of about 650° F. A second portion of the catalytic composite was subjected to the reducing action of hydrogen at a temperature of about 1050° F. The two catalyst portions were analyzed by X-ray diffraction to determine the crystallite size of the nickel existing within the composite; that portion of the catalyst which had been pre-reduced at a temperature of 650° F., indicated a crystallite size of 40° Angstrom units, whereas the composite which had been pre-reduced at a temperature in excess of 1000° F., indicated nickel having a crystallite size of about 90° Angstrom units.

Without additional treatment, the high-temperature, pre-reduced nickel-containing composite was disposed as a fixed-bed in a reaction zone, in an amount of 50 cc. The catalyst was employed to convert a highly paraffinic white oil, having the properties indicated in the following Table I, into lower-boiling hydrocarbon products.

TABLE I.—PARAFFINIC WHITE OIL CHARGE STOCK

| | |
|---|---|
| Gravity, ° API @ 60° F. | 28.4 |
| 100 ml. ASTM distillation, ° F.: | |
| Initial boiling point | 690 |
| 10% | 756 |
| 30% | 784 |
| 50% | 805 |
| 70% | 827 |
| 90% | 862 |
| End boiling point | 900 |

The reaction zone was maintained under a pressure of 1500 pounds per square inch gauge, the catalyst bed temperature being about 615° F. to 620° F. The liquid hourly space velocity, defined as volumes of hydrocarbon charge per hour per volume of catalyst disposed within the reaction zone, was maintained at about 6.0, and from about 6000 to about 6500 standard cubic feet of hydrogen, per barrel of liquid hydrocarbon charge, was passed through the reaction zone. The specific conditions of operations for each of seven individual test periods are indicated in the following Table II:

TABLE II.—OPERATING CONDITIONS AND PRODUCT DISTRIBUTION

| Period Designation | A | B | C | D | E | F | G |
|---|---|---|---|---|---|---|---|
| Catalyst Bed Temperature, ° F | 619 | 618 | 616 | 616 | 617 | 615 | 617 |
| Reaction Zone Pressure, p.s.i.g | 1,500 | 1,500 | 1,500 | 1,500 | 1,500 | 1,500 | 1,500 |
| Liquid Hourly Space Velocity | 6.1 | 6.1 | 6.0 | 6.0 | 6.0 | 6.0 | 6.0 |
| Recycle Hydrogen, s.c.f.b | 6,060 | 6,119 | 6,403 | 6,265 | 6,307 | 6,436 | 6,307 |
| Total Time On-stream, Hours | 17 | 37 | 67 | 97 | 127 | 142 | 161 |
| Liquid Product Inspection: | | | | | | | |
| Gravity, ° API at 60° F | 49.5 | 42.7 | 42.8 | 42.2 | 41.1 | 41.5 | 48.7 |
| 100 ml. ASTM Distillation, ° F.: | | | | | | | |
| Initial Boiling Point | 116 | 118 | 116 | 124 | 140 | 134 | 117 |
| 10% | 160 | 188 | 192 | 196 | 204 | 208 | 160 |
| 30% | 214 | 316 | 326 | 319 | 354 | 345 | 222 |
| 50% | 310 | 650 | 650 | 650 | 650 | 650 | 340 |
| 70% | 415 | | | | | | |
| Vol. Percent Distilled at 400° F | 68.9 | 40.7 | 40.0 | 39.2 | 36.1 | 37.4 | 65.0 |
| Vol. Percent Distilled at 650° F | 82.9 | 51.7 | 51.5 | 52.2 | 48.1 | 48.9 | 80.5 |

In the first and last periods, designated in the table as periods "A" and "G," the paraffinic white oil was admixed with an equal amount of dodecyl benzene. The addition of this highly aromatic compound to the white oil charge stock was made for the purpose of more clearly determining the stability of the catalytic composite which had been pre-reduced at the temperature of 1000° F. That is, some theories of the rapid degree of catalyst deactivation appear to rely upon the ease and rapidity with which the aromatic compounds in the heavy hydrocarbonaceous charge undergo hydrogenation and/or simultaneous demethylation, etc. With reference to Table II, test periods "A" and "G" utilized the white oil charge stock in admixture with 50% by weight of dodecyl benzene, the intervening five test periods utilized the white oil having the characteristics indicated in the foregoing Table I.

It will be noted that the total time on stream was 161 hours, over which period the operating conditions were maintained substantially without change. It will further be noted that the liquid product inspections, and particularly the volume percent conversion to gasoline boiling range hydrocarbons (below about 400° F.) and middle-distillate hydrocarbons (below about 650° F.) remained substantially unchanged throughout the extended period of operation. Furthermore, upon comparing the liquid product inspections for the first and the last test periods, it is noted that the operation was extremely stable, as indicated by the close similarity of the results obtained, without effecting substantial change in operating conditions.

The foregoing specification and example indicate the method of preparing the catalytic composite of the present invention, and illustrate the benefits afforded stability of operation when such catalysts are utilized in the conversion of heavy hydrocarbonaceous material into lower-boiling hydrocarbon products.

I claim as my invention:

1. A method of preparing a catalyst which comprises compositing at least one metallic component selected from Group VIII of the Periodic Table with a refractory inorganic oxide carrier material, calcining the resultant composite by heating the catalyst to a temperature of from about 1100° F. to about 1700° F. in an oxygen-containing atmosphere, thereafter reducing said heated composite before it is cooled below about 1000° F. in a hydrogen atmosphere at a temperature of from about 1000° F. to about 1200° F., and for a time sufficient to increase the crystallite size of said metallic component to a level of from about 60° to about 100° Angstrom units.

2. A method of preparing a nickel-containing catalyst which comprises combining nickel with at least one refractory inorganic oxide, calcining the resulting composite by heating the catalyst to a temperature of from about 1100° F. to about 1700° F. in an oxygen-containing atmosphere, thereafter reducing said heated composite before it is cooled below about 1000° F. in a hydrogen atmosphere at a temperature of from about 1000° F. to about 1200° F., and for a time sufficient to cause said nickel to increase in crystallite size to a level within the range of about 60° to about 100° Angstrom units.

3. A process for converting hydrocarbonaceous material into lower boiling hydrocarbon products which comprises reacting said hydrocarbonaceous material with hydrogen under hydrocracking conditions in the presence of a hydrocracking catalyst containing at least one metallic component selected from Group VIII of the Periodic Table which is composited with a refractory inorganic oxide carrier material; said catalyst having been calcined by heating same in air at a temperature of from about 1100° F. to about 1700° F. and, before the heated composite is cooled below about 1000° F., it is thereafter pre-reduced in an atmosphere of hydrogen at a temperature within the range of about 1100° F. to about 1200° F. for a time sufficient to increase the crystallite size of said metallic component to a level of from about 60° to about 100° Angstrom units.

4. A process of converting hydrocarbonaceous material boiling within the range of about 120° F. to about 1100° F., into lower boiling hydrocarbon products which comprises reacting said hydrocarbonaceous material with hydrogen at a pressure of from about 1000 to about 3000 pounds per square inch gauge, and at a temperature of from about 350° F. to about 750° F., in the presence of a catalyst composite which comprises at least one metallic component selected from Group VIII of the Periodic Table combined with a carrier material comprising a siliceous material and at least one other refractory inorganic oxide, said composite having been calcined by heat treatment in air at a temperature of from about 1100° F. to about 1700° F. and, thereafter reduced, before it has cooled below about 1000° F., in an atmosphere of hydrogen at a temperature in the range of from about 1000° F. to about 1200° F., said reduction treatment being maintained for a time sufficient to increase the crystallite size of said metallic component to above about 60° Angstrom units.

References Cited by the Examiner
UNITED STATES PATENTS

| | | | |
|---|---|---|---|
| 2,944,005 | 7/1960 | Scott | 208—109 |
| 3,058,906 | 10/1962 | Stine et al. | 208—111 |
| 3,166,489 | 1/1965 | Mason et al. | 208—57 |

DELBERT E. GANTZ, *Primary Examiner.*

ALPHONSO D. SULLIVAN, *Examiner.*